United States Patent [19]

Schmidt

[11] Patent Number: 4,740,567
[45] Date of Patent: Apr. 26, 1988

[54] WATER REDUCIBLE PHENOLIC MODIFIED ALKYD RESIN

[75] Inventor: Roger A. Schmidt, Chanhassen, Minn.

[73] Assignee: Cargill, Incorporated, Minneapolis, Minn.

[21] Appl. No.: 914,488

[22] Filed: Oct. 2, 1986

Related U.S. Application Data

[62] Division of Ser. No. 781,096, Sep. 27, 1985, Pat. No. 4,649,173.

[51] Int. Cl.[4] .............................................. C08L 67/08
[52] U.S. Cl. .................................... 525/442; 524/539; 524/541; 525/508; 428/480; 428/482
[58] Field of Search ...................... 525/442, 508, 480; 524/539, 541

[56] References Cited

U.S. PATENT DOCUMENTS

| | | | |
|---|---|---|---|
| 3,390,110 | 6/1968 | Dalibor | 525/508 X |
| 4,029,617 | 6/1977 | Dhein et al. | 260/20 |
| 4,180,610 | 12/1979 | Verma | 428/216 |
| 4,196,109 | 4/1980 | Laganus et al. | 524/541 |
| 4,288,351 | 9/1981 | Miller et al. | 524/512 |
| 4,346,044 | 8/1982 | Dhein et al. | 260/404.8 |
| 4,347,335 | 8/1982 | Thomas | 524/538 |

*Primary Examiner*—Theodore E. Pertilla
*Attorney, Agent, or Firm*—Fitch, Even, Tabin & Flannery

[57] ABSTRACT

Water reducible phenolic modified resins are described for use as binders in coating compositions which are non-lifting, recoatable with improved metal adhesion and corrosion resistance.

28 Claims, No Drawings

WATER REDUCIBLE PHENOLIC MODIFIED ALKYD RESIN

This is a division of application Ser. No. 781,096, filed Sept. 27, 1985, now U.S. Pat. No. 4,649,173 issued 3-10-87.

The invention is directed to a new and improved water reducible phenolic modified alkyd resin for use as a binder in coating compositions. More specifically, this invention relates to an alkyd coating resin which is a water reducible alkyd resin for use as a binder in a coating composition which alkyd resin is modified by an alkylated phenolic resin, the modified alkyd resin being a water reducible binder which provides a non-lifting recoatable coating composition.

Environmental concern has become increasingly important in recent years. This concern not only extends to preservation of the environment for its own sake, but extends to safety for the public as to both living and working conditions. Volatile organic emissions resulting from coating compositions which are applied and used by industry and by the consuming public are often not only unpleasant, but contribute to photochemical smog. Fire and health hazards of organic solvents also are well known. Governments may or have established regulations setting forth guidelines relating to volatile organic compounds (VOCs) which may be released to the atmoshpere. The United States Environmental Protection Agency (EPA) has established guidelines relating to the amount of VOCs released to the atmosphere, such guidelines being scheduled for adoption by the states of the United States. Guidelines relating to VOCs, such as those of the EPA, and environmental concerns are particularly pertinent to the paint and industrial coating industry which uses organic solvents which are emitted into the atmosphere.

With respect to coating compositions, and in response to environmental concern, organic coating resings, and most particularly alkyd coating resins have been developed and are known to reduce organic emissions with the use of water or an organic solvent water combination in lieu of using volatile organic solvents without water.

Moving from organic solvents to water or a water organic solvent combination not only changes the constituents of the alkyd, but frequently changes the curing and/or solvent retention characteristics of the coating compositions which contain the alkyd coating resin or binder. Often water as a solvent in these coating compositions will lengthen the drying times of films of these coating compositions. Generally air-drying alkyd films on metal will blister such films if they are recoated within about a three day period. This is thought to be caused by solvent penetration into the base coat and probably relates to incomplete cure or a fast cure on the surface of the coat and/or solvent retention in the base coat. Where second and third coats are required there is an obvious efficiency advantage in being able to add these additional coats of coating composition as soon as possible after applying the base coat.

In conventional organic solvent alkyd coating resin systems, the incorporation of certain phenol-formaldehyde resins into the binder resin is known to help alleviate blistering in coating compositions. These organic solvent systems, however, do not use a trifunctional acid or anhydride such as trimelletic anhydride to achieve water solubility. In water reducible alkyd systems, however, such a component generally is needed to partially react with the alkyd with residual reactive groups forming salts permitting water solubility. As is known, a water reducible alkyd resin is dispersed in water by mixing the resin with an amine or ammonia to form a salt which is then solubilized in water. The use of phenolic resins to minimize lifting with water reducible alkyd binders has heretofore been unknown.

Phenolic resins have been used with water soluble or reducible alkyd coating resins. These resins or binders, however, have required amine cross-linking agents, forced cures, and large amounts of tricarboxylic acids when formulated into coating compositions. Moreover, the literature relating to such compositions has not suggested that the use of phenolic coating resins will alleviate or have any effect on the recoatability or blistering proclivities of water reducible alkyd coating resins.

U.S. Pat. No. 4,347,335 to Thomas describes a water reducible polyester resin modified with a phenolic resin, which modified resin the patent states provides coatings with good thermal ratings, bond strengths and a coating composition with a good shelf life. The coating compositions and binders described in Thomas, however, require forced cures, aminoplast cross-linking agents, and substantial amounts of tricarboxylic acids. Moreover, the recoatability of the coating composition and blistering problem inherent with coating compositions with alkyd coating resins is not recognized or even discussed.

U.S. Pat. No. 4,196,109 to Laganis et al. describes an alkyd resin modified with a phenolic resin with carboxyl substituents and a triazine derivative in combination with water and organic solvent. The coating compositions of Laganis et al., however, require aminoplast cross-linkers and use forced cures. Recoatability and blistering are not discussed.

It has been found that by incorporating an alkylated phenolic resin into a water reducible alkyd resin in an amount from about 4 to about 20 percent by weight based upon the total weight of the phenolic modified alkyd resin, an alkyd coating resin which provides a non-lifting recoatable coating composition is obtained. Moreover, the coating compositions of the invention are curable by oxidative cross-linking and have improved metal adhesion and corrision resistance.

As used herein alkyd resin generally means a condensation product involving a polybasic acid with a polyhydric alcohol with the addition of modifying agents such as higher fatty acids. As used herein, phenolic resin generally means a phenol-formadehyde resin which is the reaction product of formaldehyde with a hydroxy substituted aromatic ring including phenol which ring has one or more hydroxyl groups on it.

In respect to the invention described herein, the alkyd resin used in the composition of the invention is the esterification product of dibasic acids with polyols, monobasic carboxylic acids or vegetable oil precursers thereof including saturated and unsaturated fatty acids having between 10 and 22 carbon atoms and monobasic aromatic acids, and a tricarboxylic acid or anhydride thereof. Esterification catalysts generally are used in preparing the alkyd. Aromatic dicarboxylic acids that can be used to prepare the alkyd resin are isophthalic acid, terephthalic acid, and phthalic acid. Polyhydric alcohols that can be used to prepare alkyd resins may have two or more hydroxyl groups and include ethylene glycol, propylene glycol, 1,3-butylene glycol, pentanediol, neopentyl glycol, hexylene glycol, diethylene glycol, dipropylene glycol, triethylene glycol, glycerol, trimethylolethane, trimethylol propane, pentaerythritol, methylglucoside, dipentaerythritol, and sorbitol with neopentyl glycol, trimethyol ethane and trimethylol propane being preferred. Tricarboxylic acids or their anhydrides that can be used to prepare the alkyd resin are trimelletic acid, trimelletic anhydride, trimesic acid and the like with trimelletic anhydride being preferred. Fatty or other carboxylic acids that are used to prepare alkyd resins are capric acid, linoleic acid, benzoic acid, dehydrated castor oil fatty acids, heat-bodied soya oil fatty acids, tung oil fatty acids, linseed oil fatty acids, safflower oil fatty acids, soya oil fatty acids, tall oil fatty acids and the like. Esterification catalysts that are used in the process for preparing alkyd resins are butyl stannoic acid, barium oxide, barium hydroxide, barium naphthenate, calcium oxide, calcium hydroxide, calcium naphthenate, lead oxide, lithium hydroxide, lithium naphthenate, lithium recinollate, sodium hydroxide, sodium naphthenate, zinc oxide, and lead tallate with butyl stannoic acid being preferred.

The phenolic modified alkyd coating resin of the invention is produced by adding the alkylated phenolic resin to the reaction mixture during or after preparation of the alkyd, preferably after substantially completing the esterification reaction between the dibasic acids and polyols. The addition and reaction of the triacid, to the reaction product, however is after the esterification reaction and preparation of the alkyd.

In respect to the invention described herein, an alkylated phenolic resin is a reaction product of an alkylated phenol and formaldehyde wherein the alkyl substitution is at the paraposition on the aromatic ring which substitution is with straight or branched alkyl groups having from 1 to 18 carbon atoms, preferably the alkylation being tertiary butyl. The alkylated phenolic resin is non-heat reactive and made under acid conditions.

By using a non-heat reactive alkylated phenolic resin it would be expected to obtain a product which is a simple physical blend of alkylated phenolic resin and alkyd. While not intending to be bound by any theory, it appears that an interreaction between the alkyd and alkylated phenolic resin occurs to render an alkylated phenolic modified coating resin which has improved recoatability characteristics wherein the coating composition containing the coating resin is fast drying, non-lifting and does not require aminoplast cross-linking agents. Additional to improved recoatability, the coating resin of the invention without amino cross-linking agents provides coating compositions with improved corrosion resistance, improved early water resistace and improved metal adhesion.

It is an object of the invention to provide a water reducible alkyd coating resin modified with an alkylated phenolic resin which will provide a non-lifting, recoatable coating composition which is fast drying and which may be free of aminoplasts or amino cross-linking agents.

It is another object of the invention to provide a method of making a new alkylated phenolic resin modified alkyd which will provide a non-lifting, recoatable coating compositions.

These and other objects of the invention will become more apparent with reference to the following detailed description.

Generally the alkylated phenolic modified alkyd coating resin is made by first obtaining a first ester by reacting with heat from about 20 to about 50 parts by weight polyol per 100 weight of the resulting alkyd coating resin of the invention (hereafter "parts by weight" unless otherwise indicated) with from about 15 to about 60 parts by weight fatty acid and from about 0.005 to about 0.05 parts by weight of an esterification catalyst such as a butyl stannoic acid catalyst sold under the name Fascat 4100 by M&T Chemicals, Inc. When the latter reaction mixture containing the first ester has an acid value of less than 15 and preferably less than 3, the reaction mixture is cooled and from about 15 to about 50 parts by weight of a dibasic acid or anhydride thereof is added thereof; the resulting reaction mixture being heated to form an intermediate polyester with an acid value of less than about 25 and preferably between 11 to 12. The reaction mixture containing the intermediate polyester is cooled and the alkylated phenolic resin is added thereto with agitation and heated to form an alkylated phenolic modified polyester resin with an acid value of about 5 to about 35, preferably about 18. The alkylated phenolic modified polyester resin is mixed with heat with from about 3 to about 15 parts by weight of a tricarboxylic acid of anhydride thereof which yields and alkylated phenolic modified alkyd resin with an acid value of from about 30 to about 60 and preferably about 35 to about 45. The prereaction of the polyol is preferred. Further, the alkylated phenolic resin may be mixed with the alkyd after the formation of the alkyd or with its prereacted components with the addition after the formation of the alkyd being preferred. The trimelletic anhydride or its equivalent, however, must be charged after the formation of the alkyd. At 50% solids in xylene an alkylated phenolic modified alkyd resin, according to the invention, can have a viscosity in the range of S to U and preferably about T on the Gardner-Holdt scale as measured by ASTM method D1545-76.

The modified alkyd resin may be thinned with from about 50 to about 80 parts by weight of an organic solvent such as butoxyethanol, secondary butanol, propoxypropanol, pent-oxone or 4 methoxy-4-methylpentanone-2, or diacetone alcohol. From about 5 to about 60 parts by weight (based upon the weight of the coating composition) of the modified alkyd may then be ground or dispersed with pigments, solvent and metal driers to provide a coating composition with a pigment binding ratio of from about 0.05 to about 1.5.

The following examples are provided to illustrate the invention more fully; however, they should not be construed as limiting the scope of the invention, many variations of which are contemplated.

EXAMPLE 1

24.12 parts by weight of a $C_{18}$ synthetic fatty acid derived from tall oil (commercially available from Hercules Chemical Company as Pamolyn 327-B) and 14.86 parts by weight trimethylol propane is charged into a reaction vessel fitted with a distillation column under nitrogen and heated to 280° F. whereupon 0.01 parts by weight of a butyl stannoic acid esterification catalyst (Fascat 4100) is added to the reaction mixture which is heated to 360° F. where distillation begins. The reaction mixture then is heated to 440° F. for over 1½ hours with a water loss of about 1.52 parts by weight to attain an acid value less than 3. When the latter acid value is attained, the reaction is cooled to 325° F. and 8.01 parts by weight of neopentylglycol (1% excess), 23.22 parts by weight isophthalic acid, 2.10 parts by weight terephthalic acid and 0.01 parts by weight Fascat 4100 are added to the coooled reaction mixture which then is heated to about 390° F. at which temperature distillation resumes. From 390° F. the reaction mixture is heated to 440° F. for over 2 hours with the loss of 5.37 parts by weight water and 0.08 parts by weight glycol, to attain an acid value of 11.0-12.0 and a Gardner-Holdt viscosity of Y at 70% solids in xylene. After the reaction mixture has an acid value between 11.0-12.0 the reaction mixture is cooled rapidly to 410° F., the nitrogen reduced to blanket, agitation increased and 5.99 parts by weight of an oil soluble tertiary butyl phenolic resin having a softening point of 235°-250° F. (available from Union Carbide Corporation as CK2500) is added to the reaction mixture. After the addition of the phenolic, the reaction mixture is held at 390°-400° F. for ½ hour with the phenolic being dissolved. The reaction mixture with the dissolved phenolic then is cooled to 350°-355° F. and is sampled such that the reaction mixture should have an acid value of 15 to 20 and a Gardner-Holdt viscosity of Z at 70% solids in xylene. After the addition of the phenolic and the acid value of 18 is reached, 3.65 parts by weight of trimellitic anhydride is added to the reaction mixture which is reacted at about 345°-350° F. for 15 minutes to attain an acid value of 42, and a Gardner-Holdt viscosity of N at 50% solids in xylene. After the addition of the trimellitic and the reaction mixture is sampled for an acid value of 42, heating is continued at 345°-350° F. which heat is held until the reaction mixture is sampled for a Gardner-Holdt viscosity of Q-R at 50% xylol; at which time the heat is reduced to 330° F. which is held until the reaction mixture is sampled for a viscosity of T-T ½ at 50% xylol. After a viscosity of T-T ½ is reached, the resulting phenolic modified alkyd is cooled to 300° F. and 12.50 parts by weight of 2-butoxyethanol is added thereto with agitation. After addition of the 2-butoxyethanol, 12.50 parts by weight of secondary butanol is added to the phenolic modified alkyd resin, both the butyl cellosolve and secondary butanol being added to thin the alkyd for handling and drumming.

EXAMPLE 2

The same procedure of Example 1 with the following reactants.

| REACTANT | PARTS BY WEIGHT |
|---|---|
| 1. C$_{18}$ fatty acid (Pamolyn 200) | 21.05 |
| 2. Tall oil fatty acid with less than 1% by weight rosin acids (Pamak 1 from Hercules Chemical Company) | 2.18 |
| 3. C$_{18}$ saturated acid (Hydrolfol acid 1895 from Ashland Chemical Co.) | 0.66 |
| 4. C$_{16}$ saturated fatty acid (Hydrofol acid 1690 from Ashland Chemical Company) | 0.27 |
| 5. Trimethylol propane | 15.86 |
| 6. Esterification catalyst (Fascat 4100) | 0.01 |
| | 40.03 |
| Water (water loss) | 1.52 |
| | 38.51 |
| 7. Neopentyl glycol (1% excess) | 6.76 |
| 8. Isophthalic acid | 23.38 |
| 9. Terephthalic acid | 2.11 |
| 10. Esterification catalyst (Fascat 4100) | 0.01 |
| | 77.77 |
| Water | 5.36 |
| | 65.41 |
| Glycol loss | 0.07 |
| | 65.34 |
| 11. Butylated phenolic resin (CK 2500) | 6.00 |
| | 71.34 |
| 12. Trimellitic anhydride | 3.66 |
| | 75.00 |
| 13. 2-butoxyethanol | 12.50 |
| 14. Secondary Butanol | 12.50 |
| | 100.00 |

Reactants 1-5 are charged and reacted as in Example 1 to an acid value less than 3. The reaction mixture then is cooled to 325° F. and reactants 7 to 10 are added with the mixture being heated to 440° F. for over 2 hours, with the water and glycol loss as indicated, to an acid value of 8. After the latter acid value is obtained, the reaction mixture is cooled to 410° F. and reactant 11 is added and held at temperature for 30 minutes then cooled to 350° F. After cooling reactant 12 is added under nitrogen blanket and the temperature held at 340°-345° F. for 15 minutes whereupon it is cooled to 310°-320° F. and held at that temperature until a viscosity of V ½-W at 50% nonvolatiles in xylene is attained. Then the reaction is cooled to 200° F. and 13 is added. With further cooling to 170° F. 14 is added.

EXAMPLE 3

The following unmodified alkyd resin was prepared pursuant to the procedures set forth in Examples 1 and 2.

| REACTANT | PARTS BY WEIGHT |
|---|---|
| 1. C$_{18}$ fatty acid (Pamolyn 200) | 22.98 |
| 2. Tall oil fatty acid with less than 1% by weight rosin acids (Pamak 1 from Hercules Chemical Company) | 2.38 |
| 3. C$_{18}$ saturated acid (Hydrolfol acid 1895 from Ashland Chemical Co.) | 0.72 |
| 4. C$_{16}$ saturated fatty acid (Hydrofol acid 1690 from Ashland Chemical Company) | 0.30 |
| 5. Trimethylol propane | 19.08 |
| 6. Esterification catalyst (Fascat 4100) | 0.01 |
| | 45.47 |
| Water (water loss) | 1.66 |
| | 43.81 |
| 7. Neopentyl glycol (1% excess) | 5.12 |
| 8. Isophthalic acid | 26.20 |
| 9. Terephthalic acid | 2.37 |
| 10. Esterification catalyst (Fascat 4100) | 0.01 |
| | 77.51 |
| Water (water loss) | 6.12 |
| | 71.39 |
| Glycol loss | 0.05 |
| | 71.34 |
| 11. Trimellitic anhydride | 3.66 |
| | 75.00 |
| 12. 2-butoxyethanol | 12.50 |
| 13. Secondary Butanol | 12.50 |
| | 100.00 |

The acid value after reactants 7-10 are added is 16-17; thereafter the reaction is cooled to 350° F. and reactant 11 is added. The reaction then is held at 345°-350° F. for 15 minutes, then cooled to 300° F. and held at that temperature for a viscosity of X at 50% nonvolatiles in xylene. Then 12 and 13 are added while cooling the reaction to 170° F.

EXAMPLE 4

| REACTANT | PARTS BY WEIGHT |
|---|---|
| 1. A refined tall fatty acid (Pamolyn 327B Hercules) | 24.64 |
| 2. Trimethylolpropane | 12.52 |
| 3. Neopentyl glycol | 8.24 |
| 4. Isophthalic acid | 20.07 |
| 5. Benzoic acid | 3.36 |
| 6. A styrene/allyl alcohol oligomer (RJ-100 Monsanto) | 1.12 |
| | 69.95 |
| water | 6.31 |
| | 63.64 |
| glycol | 0.08 |
| | 63.56 |
| 7. Butylated phenolic resin CK-2500 (Union Carbide) | 6.00 |
| | 69.56 |
| 8. Trimellitic anhydride | 5.55 |
| | 75.11 |
| water | 0.10 |
| | 75.01 |
| 9. Butoxyethanol | 12.50 |
| 10. Secondary butanol | 12.50 |
| | 100.01 |

Reactants 1-6 are charged into a reactor equipped with a heat and cooling source, stirrer, inert gas sparge line, fractionating column, and heated to 480° F. under an inert gas sparge and agitation. The reactants are held at 480° F. for an acid value of about 7 and a viscosity of about V on the Gardner-Holdt scale when reduced to 75% non-volatile in xylene. The reaction is cooled to about 415° F. and 7 is added. The reactants are held at 415° F. for about 30 minutes and then cooled to 350° F. Reactant 8 is added and the reaction mixture held at 350°-360° F. for an acid value of 42-46 and a viscosity of about Z5 when reduced to 75 percent non-volatile with equal parts of butoxyethanol and secondary butanol. The reaction then is cooled to 300° F. Reactant 9 is added, then reactant 10 is added.

This product is a clear solution having the following physical properties:

| Percent non-volatile | 75 |
|---|---|
| Gardner-Holdt viscosity | Z5 |
| Acid value | 45 |
| Gardner color | 8 |

EXAMPLE 5

| REACTANT | PARTS BY WEIGHT |
|---|---|
| 1. A refined tall fatty acid (Pamolyn 327B Hercules) | 24.64 |
| 2. Trimethylolpropane | 12.52 |
| 3. Neopentyl glycol | 8.24 |
| 4. Isophthalic acid | 20.07 |
| 5. Benzoic acid | 3.36 |

| REACTANT | PARTS BY WEIGHT |
|---|---|
| 6. Styrene/allyl alcohol oligomer (RJ-100 Monsanto) | 1.12 |
| | 69.95 |
| water | 6.31 |
| | 63.64 |
| glycol | 0.08 |
| | 63.56 |
| 7. Butylated phenolic resin CK-2400 (Union Carbide, softening paint 290°-315° F.) | 6.00 |
| | 69.56 |
| 8. Trimellitic anhydride | 5.55 |
| | 75.11 |
| water | 0.10 |
| | 75.01 |
| 9. Butoxyethanol | 12.50 |
| 10. Secondary butanol | 12.50 |
| | 100.01 |

The reactants were mixed and reacted as described in Example 4.

This product is a clear solution having the following physical properties.

| Percent non-volatile | 75 |
|---|---|
| Gardner-Holdt viscosity | Z5 |
| Acid value | 44 |
| Gardner color | 9 |

The performance of the resins of Examples 1 and 3 were compared by compounding a coating composition with pigments, pigment extenders, thickeners, defoamers, surfactants and anti-skimming agents and other additives that was a low gloss black enamel with the binders of Examples 1 and 3 at 75% non-volatiles and additives as identified below.

PIGMENT GRIND

| | PARTS BY WEIGHT |
|---|---|
| INGREDIENTS | |
| WATER REDUCIBLE RESIN (75% N.V.) | 9.08 |
| Ammonium Hydroxide-28% | 0.62 |
| Sec-Butanol | 1.56 |
| Special Black 4 (Degussa) - pigment | 1.56 |
| Aerosil R-972 (Degussa) - thickner | 0.52 |
| Imsil A-10 (Illinois Mineral)-pigment extender | 3.75 |
| VP-020 (Byk-Mallinckrodt) - defoamer | 0.31 |
| Surfynol 104E (Air Products) - surfactant | 0.20 |
| Deionized Water | 10.38 |
| Pebblemill to 7.5 N.S. | |
| GRIND LET DOWN | |
| WATER REDUCIBLE RESIN (75% N.V.) | 26.99 |
| Ammonium Hydroxide-28% | 1.27 |
| 6% Cobalt Intercar (Interstab)-drier | 0.27 |
| 6% Zirco Intercar (Interstab)-drier | 0.36 |
| 4% Calcium Intercar (Interstab)-drier | 0.20 |
| Sec-Butanol | 1.56 |
| Active-8 (R. T. Vanderbilt)-an activator to increase effectiveness of metal driers | 0.09 |
| Exkin #2 (Tenneco) - antiskinning agent to retard oxidative reactions during storage | 0.09 |
| Deionized Water | 35.55 |
| Deionized Water (Hold for Viscosity Adjustment) Totals | 5.61 |
| Totals | 99.97 |
| ENAMEL PROPERTIES | |

| | PARTS BY WEIGHT |
|---|---|
| % Non-Volatiles | |
| (By Weight): | 33.44 |
| (By Volume): | 28.43 |
| Pigment/Binder Weight Ratio: | 0.21 |
| Solvent VOC: | 2.54 lbs/gallon |
| | 304.28 gms/liter |
| Viscosity | 60–80 Sec. #4 Ford Cup |
| pH | 8.0–8.5 |

DISPERSION PROCEDURE

The above ingredients are mixed by first mixing all of the pigment grind components except the deionized water. After the latter pigment grind components are completely mixed, the viscosity of the mix is adjusted to 65–70 Kreb units using the withheld deionized water. This pigment grind mixture is put into a steel ball mill and ground to a N. S. grind of 7.5 on the Hegman scale.

The secondary butanol, metal driers and Active-8 components of the grind let-down are premixed. This premix and the remainder of the components of the grind let-down are mixed in the order shown with the water being withheld for the final viscosity adjustment. The grind let-down is mixed into the grind. The viscosity of the grind and grind let-down mix is adjusted to 60–80 seconds #4 Ford Cup with the withheld water from the let-down charge.

| FILM PROPERTIES | Film Using the Resin of Example 1 | Film Using the Resin of Example 3 |
|---|---|---|
| Pencil Hardness | B | HB |
| Conical Mandrel | Pass | Pass |
| QCT Humidity Resistance (115 Hrs.) | Dense - Very small blisters | Dense - medium blisters |
| Salt Fog Resistance (240 Hrs.) | | |
| Scribe Creep (inch) | | 3/16 |
| Surface Blistering | None | Some very small blisters |

The performance of the resins of Examples 2 and 3 were compared by compounding a coating composition that was a red oxide primer with the binders of Examples 2 and 3 at 75% non-volatiles, the pigments and solvents as identified below.

PIGMENT GRIND

| COMPONENTS | PARTS BY WEIGHT |
|---|---|
| Alkyd Resin at 75% N.V. | 17.05 |
| Butoxyethanol | 4.23 |
| BYC (BYC - Mallinckrodt)-a polysiloxane copolymer flow agent | 0.16 |
| Ammonium Hydroxide - 28% Aqueous | 1.06 |
| Deionized Water | 17.69 |
| Atomite (Thompson-Weinman) - extender pigment | 8.22 |
| VVF Barytes (Pfizer) - extender pigment | 8.73 |
| Imsil A-10 (Illinois Minerals) | 1.86 |
| Mapico Crimson Red #98 - pigment (Cities Service) | 8.52 |

| | PARTS BY WEIGHT |
|---|---|
| Zinc Phosphate #317 - anti-corrosive pigment (Reichard-Coulston) | 6.78 |
| Aerosil R-972 (Degussa) | 0.79 |
| GRIND LET DOWN | |
| Alkyd Resin at 75% N.V. | 6.98 |
| Ammonium Hydroxide - 28% Aqueous | 0.42 |
| Butoxyethanol | 1.41 |
| 6% Cobalt Intercar (Interstab) | 0.17 |
| 4% Calcium Intercar (Interstab) | 1.02 |
| 3% Zirconium Intercar (Interstab) | 0.20 |
| Active-8 (R. T. Vanderbilt) | 0.08 |
| Exkin #2 (Tenneco) | 0.09 |
| Deionized Water | 10.43 |
| Deionized Water | 4.32 |
| | 100.01 |
| ENAMEL PROPERTIES | |
| Percent non-volatile | 54 |
| Pigment to binder ratio | 1.9 |
| Volatile organic components | 2.4 |
| Viscosity (Kreb units) | 60–80 |
| pH | 8.0–8.5 |

DISPERSION PROCEDURE

Charge the components of the pigment grind to a pebblemill and grind to a N.S. Grind (Hegman) of 7.5.

Premix the butoxyethanol, metal driers and Activ 8 components of the grind let-down.
Add all but the last let-down components and the above premix in the order shown and mix well by stirring.
Adjust the pH to 8.0–8.5 with additional ammonium hydroxide.
Adjust the viscosity to 75 to 80 Kreb units using the remaining component (water).

FILM PREPARATION

The primers are sprayed onto cold-rolled steel Parker test panels to obtain a 1 mil thickness of dry film. The coated panels are permitted to dry for seven days before evaluation.

| FILM PROPERTIES | Example 2 | Example 3 |
|---|---|---|
| Resistance to Lifting | Excellent | Good |
| Pencil Hardness | HB | HB |
| Impact Resistance (inch-lbs) | | |
| Forward | 80 | 30 |
| Reverse | 10 | <5 |
| QCT Humidity Resistance (72 Hrs.) | Very few - Very small blisters | Dense - Small blisters |
| Salt Fog Resistance (72 Hrs.) (Corrosion Resistance) | | |
| Scribe Creep (inch) | 1/16 | ¼ |
| Surface Blistering | None | Slight |
| Water Soak (12 days) | No blistering - slight fading | Moderate blistering - considerable fading |
| Gloss (60/20 degree) | 92/63 | 92/63 |

The alkyd resins of Examples 4 and 5 were evaluated in red oxide primers prepared from the following formulation:

PIGMENT GRIND

| INGREDIENTS | PARTS BY WEIGHT |
|---|---|
| Phenolic modified alkyd resin at 75% non-volatile | 12.55 |
| Butoxyethanol | 3.30 |
| BYC 301 | 0.12 |
| Ammonia hydroxide (28% aqueous) | 0.83 |
| Atomite | 6.41 |
| Sparmite - BaSO₄-an extender pigment from Pfizer | 6.80 |
| Imsil A-10 | 1.44 |
| Mapico Medium 516 (Columbian Chemical) | 6.61 |
| Zinc Phosphate 317 | 5.28 |
| Aerosil R-972 | 0.62 |
| Deionized water | 26.73 |
| GRIND LET DOWN | |
| Phenolic modified alkyd resin at 75% non-volatile | 6.17 |
| Ammonium hydroxide (28% aqueous) | 0.49 |
| Butoxyethanol | 1.10 |
| 6% Cobalt Intercar | 0.13 |
| 4% Calcium Intercar | 0.80 |
| 6% Zinconium Intercar | 0.15 |
| Active-8 | 0.07 |
| Exkin #2 | 0.08 |
| Deionized water | 9.85 |
| Deionized water | 10.48 |
| | 100.00 |

These enamels were prepared by the process described as to the primers prepared from the resins of Examples 1 to 3.

The enamels have the following physical properties.

| | PRIMER PERFORMANCE | |
|---|---|---|
| FILM PROPERTIES | Film Using modified Alkyd of Composition 4 | Film Using modified Alkyd of Composition 5 |
| Pencil Hardness | HB | HB |
| Resistance to lifting | Very good | Excellent |
| Impact resistance | | |
| Forward | 40 | 80 |
| Reverse | <5 | 30 |
| QCT humidity resistance (144 hrs.) | few - very small blisters | no blisters |
| Salt Fog resistance (144 Hrs.) | | |
| Scribe Creep (inch) | ⅛ | ⅛ |
| Surface Blistering | None | None |

It should be understood that while certain preferred embodiments of the present invention have been illustrated and described, various modifications thereof will become apparent to those skilled in the art. Accordingly, the scope of the present invention should be defined by the appended claims and equivalents thereof.

Various features of the invention are set forth in the following claims.

What is claimed is:

1. A water reducible alkyd resin free of aminoplasts or amino cross-linking agents comprising:
a resin which is a reaction product of from about 15 to about 50 parts by weight based per 100 weight of the resulting water reducible alkyd of a dibasic acid or an acid anhydride thereof, from about 20 to about 50 parts by weight per 100 weight of resulting alkyd of a polyol containing at least two hydroxyl groups per molecule, from about 15 to about 60 parts by weight per 100 weight of resulting alkyd of a monobasic carboxylic acid, from about 3 to about 15 parts by weight per 100 weight of resulting alkyd of a tricarboxylic acid or acid anhydride thereof, and from about 4 to about 20 parts by weight per 100 weight of resulting alkyd of an alkylated phenolic resin which is not heat reactive to provide a water reducible alkyd resin which is free of aminoplasts or amino cross-linking agents and curable without said agents.

2. An alkyd resin as recited in claim 1 wherein the alkylated phenolic resin has alkyl substitution at the para position on at least one of the aromatic rings of the phenolic resin and the alkyl groups are straight or branched having from 1 to 18 carbon atoms.

3. An alkyd resin as recited in claim 2 wherein the alkylated phenolic resin is a reaction product of an alkylated phenol and formaldehyde under acid conditions.

4. An alkyd resin as recited in claim 1 wherein the dibasic acid or anhydride thereof, the polyol and the fatty acid are reacted to form an alkyd, the alkylated phenolic resin is mixed with the alkyd to form a phenolic alkyd mix and the tricarboxylic acid or anhydride thereof is reacted with the phenolic alkyd mix to form the water reducible alkyd resin.

5. An alkyd resin as recited in claim 2 wherein the dibasic acid or anhydride thereof, the polyol and the monobasic carboxylic acid are reacted to form an alkyd, this alkylated phenolic resin is mixed with the alkyd to form a phenolic alkyd mix and the tricarboxylic acid or anhydride thereof is reacted with the phenolic alkyd mix to form the water reducible alkyd resin.

6. An alkyd resin as recited in claim 3 wherein the dibasic acid or anhydride thereof, the polyol and the monobasic carboxylic acid are reacted to form an alkyd, the alkylated phenolic resin is mixed with the alkyd to form a phenolic alkyd mix and the tricarboxylic acid or anhydride thereof is reacted with the phenolic alkyd mix to form the water reducible alkyd resin.

7. An alkyd resin as recited in claim 1 wherein the dibasic acid or anhydride thereof is isophthalic acid or the anhydride thereof, terephthalic acid or the anhydride thereof, phthalic acid or the anhydride thereof, or mixtures thereof, the polyol is neopentyl glycol, propylene glycol, trimethylol propane or mixtures thereof, and the tricarboxylic acid or anhydride thereof is trimellitic acid or the anhydride thereof.

8. An alkyd resin as recited in claim 2 wherein the dibasic acid or anhydride thereof is isophthalic acid or the anhydride thereof, terephthalic acid or the anhydride thereof, phthalic acid or the anhydride thereof, or mixtures thereof, the polyol is neopentyl glycol, propylene glycol, trimethyol propane or mixtures thereof, and the tricarboxylic acid or anhydride thereof is trimelletic acid or the anhydride thereof.

9. An alkyd resin as recited in claim 4 wherein the dibasic acid or anhydride thereof is isophthalic acid or the anhydride thereof, terephthalic acid or the anhydride thereof, phthalic acid or the anhydride thereof, or mixtures thereof, the polyol is neopentyl glycol, propylene glycol, trimethyol propane or mixtures thereof, and the tricarboxylic acid or anhydride thereof is trimelletic acid or the anhydride thereof.

10. An alkyd resin as recited in claim 5 wherein the dibasic acid or anhydride thereof is isophthalic acid or the anhydride thereof, terephthalic acid or the anhydride thereof, phthalic acid or the anhydride thereof, or mixtures thereof, the polyol is neopentyl glycol, propylene glycol, trimethyol propane or mixtures thereof, and the tricarboxylic acid or anhydride thereof is trimelletic acid or the anhydride thereof.

11. A method of making a water reducible alkyd resin which is free of aminoplasts or amino cross-linking agents, said method comprising:

mixing reactants comprising from about 15 to about 60 parts by weight per 100 weight of resulting water reducible alkyd resin of a monobasic carboxylic acid, from about 20 to about 50 parts by weight per 100 weight of resulting water reducible alkyd resin of a polyol having at least two hydroxyl groups, from about 15 to about 50 parts by weight based per 100 weight of the resulting water reducible alkyd resin of a dibasic acid or an acid anhydride thereof;

mixing from about 4 to about 20 parts by weight per 100 weight of resulting water reducible alkyd resin of an alkylated phenolic resin which is not heat reactive into the reactants, the reactants and the alkylated phenolic forming a reactant phenolic resin mix;

heating the reactant phenolic resin mix to form a phenolic alkyd mix; and reacting said phenolic alkyd mix with from about 3 to about 15 parts by weight per 100 weight of resulting water reducible alkyd resin of a tricarboxylic acid or an acid anhydride thereof to form the water reducible alkyd resin which is free of aminoplasts or amino cross-linking agents and is curable without said agents.

reacting said phenolic alkyd mix with from about 4 to about 20 parts by weight per 100 weight of resulting alkyd of a tricarboxylic 12. A method as recited in claim 11 wherein the alkylated phenolic resin has alkyl substitution at the para position on at least one of the aromatic rings of the phenolic resin and the alkyl groups are straight or branched having from 1 to 18 carbon atoms.

13. A method as recited in claim 12 wherein the alkylated phenolic resin is a reaction product of any alkylated phenol and formaldehyde under acid conditions.

14. A method as recited in claim 11 wherein the dibasic acid or anhydride thereof, the polyol and the monobasic carboxylic acid are reacted to form an alkyd, the alkylated phenolic resin is mixed with the alkyd to form a phenolic alkyd mix and the tricarboxylic acid or anhydride thereof is reacted with the phenolic alkyd mix to form the water reducible alkyd resin.

15. A method as recited in claim 12 wherein the dibasic acid or anhydride thereof, the polyol and the monobasic carboxylic acid are reacted to form an alkyd, the alkylated phenolic resin is mixed with the alkyd to form a phenolic alkyd mix and the tricarboxylic acid or anhydride thereof is reacted with the phenolic alkyd mix to form the water reducible alkyd resin.

16. A method as recited in claim 13 wherein the dibasic acid or anhydride thereof, the polyol and the monobasic carboxylic acid are reacted to form an alkyd, the alkylated phenolic alkyd mix and the tricarboxylic acid or anhydride thereof is reacted with the phenolic alkyd mix to form the water reducible alkyd resin.

17. A method as recited in claim 11 wherein the dibasic acid or anhydride thereof is isophthalic acid of the anhydride thereof, terephthalic acid or the anhydride thereof, phthalic acid or the anhydride thereof, or mixtures thereof, the polyol is neopentyl glycol, propylene glycol, trimethyol propane or mixtures thereof, and the tricarboxylic acid or anhydride thereof is trimellitic acid or the anhydride thereof.

18. A method as recited in claim 12 wherein the dibasic acid or anhydride thereof is isophthalic acid or the anhydride thereof, terephthalic acid or the anhydride thereof, phthalic acid or the anhydride thereof, or mixtures thereof, the polyol is neopentyl glycol, propylene glycol, trimethyol propane or mixtures thereof, and the dricarboxylic acid or anhydride thereof is trimellitic acid or the anhydride thereof.

19. A method as recited in claim 14 wherein the dibasic acid or anhydride thereof is isophthalic acid or the anhydride thereof, terephthalic acid or the anhydride thereof, phthalic acid or the anhydride thereof, or mixtures thereof, the polyol is neopentyl glycol, propylene glycol, trimethyol propane or mixtures thereof, and the tricarboxylic acid or anhydride thereof is trimellitic acid or the anhydride thereof.

20. A method as recited in claim 15 wherein the dibasic acid or anhydride thereof is isophthalic acid or the anhydride thereof, terephthalic acid or the ahydride thereof, phthalic acid or the anhydride thereof, or mixtures thereof, the polyol is neopentyl glycol, propylene glycol, trimethyol propane or mixtures thereof, and the tricarboxylic acid or anhydride thereof is trimellitic acid or the ahydride thereof.

21. A method as recited in claim 14 wherein the polyol and the monobasic carboxylic acid are reacted to form an ester and the ester is reacted with the dibasic acid to form an alkyd.

22. A method as recited in claim 16 wherein the polyol and the monobasic carboxylic acid are reacted to form an ester and the ester is reacted with the dibasic acid to form an alkyd.

23. A method as recited in claim 20 wherein the polyol and the monobasic carboxylic acid are reacted to form an ester and the ester is reacted with the dibasic acid to form an alkyd.

24. A resin made according to the method of claim 11.

25. A resin made according to the method of claim 12.

26. A resin made according to the method of claim 14.

27. A resin made according to the method of claim 20.

28. A resin made according to the method of claim 23.

* * * * *

UNITED STATES PATENT AND TRADEMARK OFFICE
CERTIFICATE OF CORRECTION

PATENT NO. : 4,740,567
DATED : April 26, 1988
INVENTOR(S) : Roger A. Schmidt

It is certified that error appears in the above-identified patent and that said Letters Patent is hereby corrected as shown below:

Column 2, line 50, change "formadehyde" to --formaldehyde--.

Column 3, line 4, change "trimethyol" to --trimethylol--.

line 19, change "recinollate" to --recinoleate--.

line 51, change "resistace" to --resistance--.

Column 4, line 12, change "thereof" to --thereto--.

line 22, change "of" to --or--.

line 23, change "and" to --an--.

Column 8, line 66, after "Adjustment)" delete "Totals and "99.97".

line 67, after "Totals" insert --99.97--.

UNITED STATES PATENT AND TRADEMARK OFFICE
CERTIFICATE OF CORRECTION

PATENT NO. : 4,740,567
DATED : April 26, 1988
INVENTOR(S) : Roger A. Schmidt

It is certified that error appears in the above-identified patent and that said Letters Patent is hereby corrected as shown below:

Column 11, line 34,

> insert --Percent non-volatile        30%
>
>      Pigment to binder ratio        1.9
>
>      Volatile organic components    2.42 lb./gal.
>
>      Viscosity (Kreb units)         80 Kreb Units
>
>      pH                                     8.4--.

Claim 5, column 12, line 29, change "this" to --the--.

Column 12, line 54, change "trimethyol" to --trimethylol--.

Column 12, lines 55-56, change "trimelletic" to --trimellitic--.

Column 12, line 62, change "trimethyol" to -- trimethylol--.

Column 12, line 63-64, change "trimelletic" to --trimellitic--.

UNITED STATES PATENT AND TRADEMARK OFFICE
CERTIFICATE OF CORRECTION

PATENT NO. : 4,740,567
DATED : April 26, 1988
INVENTOR(S) : Roger A. Schmidt                    Page 3 of 4

It is certified that error appears in the above-identified patent and that said Letters Patent is hereby corrected as shown below:

Column 13, line 2, change "trimethyol" to --trimethylol--.

Column 13, line 3-4, change "trimelletic" to --trimellitic--.

Column 13, lines 33-35, delete "reacting said...tricarboxylic".

Claim 16, column 14, line 2, after "phenolic" insert --resin is mixed with the alkyd to form a phenolic--.

Claim 17, column 14, line 6, change "of" to --or--.

Column 14, line 10, change "trimethyol" to --trimethylol--.

Claim 18, column 14, line 19, change "dricarboxylic" to --tricarboxylic--.

UNITED STATES PATENT AND TRADEMARK OFFICE
CERTIFICATE OF CORRECTION

PATENT NO.  : 4,740,567
DATED       : April 26, 1988
INVENTOR(S) : Roger A. Schmidt It is certified that error appears in the above-identified patent and that said Letters Patent is hereby corrected as shown below:

Column 14, line 26, change "trimethyol" to --trimethylol--.

Column 14, line 34, change "trimethyol" to "trimethyol" to --trimethylol--.

Signed and Sealed this

Third Day of October, 1989

*Attest:*

DONALD J. QUIGG

*Attesting Officer*       *Commissioner of Patents and Trademarks*